(12) United States Patent
Han et al.

(10) Patent No.: US 7,486,510 B2
(45) Date of Patent: Feb. 3, 2009

(54) MOUNTING APPARATUS FOR DATA STORAGE DEVICE

(75) Inventors: Shao-Bo Han, Shenzhen (CN); Yong-Gang Zhang, Shenzhen (CN)

(73) Assignees: Hong Fu Jin Precision Industry (Shenzhen) Co., Ltd., Shenzhen, Guangdong Province (CN); Hon Hai Precision Industry Co., Ltd., Taipei Hsien (TW)

( * ) Notice: Subject to any disclaimer, the term of this patent is extended or adjusted under 35 U.S.C. 154(b) by 293 days.

(21) Appl. No.: 11/403,496

(22) Filed: Apr. 13, 2006

(65) Prior Publication Data

US 2006/0232925 A1    Oct. 19, 2006

(30) Foreign Application Priority Data

Apr. 15, 2005    (CN) .................... 2005 2 0057333 U

(51) Int. Cl.
*G06F 1/16* (2006.01)
*H05K 5/00* (2006.01)
*H05K 7/00* (2006.01)

(52) U.S. Cl. .................................................. 361/685
(58) Field of Classification Search ................ 361/683, 361/684, 685, 686, 724
See application file for complete search history.

(56) References Cited

U.S. PATENT DOCUMENTS

| | | | |
|---|---|---|---|
| 5,599,080 A | 2/1997 | Ho | |
| 5,801,920 A * | 9/1998 | Lee | 361/685 |
| 6,297,952 B1 * | 10/2001 | Liu et al. | 361/685 |
| 6,304,457 B1 * | 10/2001 | Liu et al. | 361/685 |
| 6,396,686 B1 * | 5/2002 | Liu et al. | 361/685 |
| 6,456,489 B1 * | 9/2002 | Davis et al. | 361/685 |
| 6,473,313 B1 * | 10/2002 | Chen et al. | 361/685 |
| 6,590,775 B2 * | 7/2003 | Chen | 361/725 |
| 6,654,238 B2 * | 11/2003 | Chen | 361/685 |
| 6,728,109 B1 * | 4/2004 | Wu | 361/685 |
| 6,757,163 B2 * | 6/2004 | Jeong | 361/685 |
| 6,813,148 B2 * | 11/2004 | Hsu et al. | 361/685 |
| 6,826,045 B2 | 11/2004 | Chen | |
| 6,853,549 B2 * | 2/2005 | Xu | 361/685 |
| 6,885,550 B1 * | 4/2005 | Williams | 361/685 |
| 6,935,604 B2 * | 8/2005 | Chen | 361/685 |
| 6,980,429 B2 * | 12/2005 | Ericks n et al. | 361/685 |
| 7,006,351 B2 * | 2/2006 | Chen et al. | 361/685 |
| 7,180,734 B2 * | 2/2007 | Jing | 361/685 |
| 7,212,411 B2 * | 5/2007 | Williams | 361/685 |

(Continued)

*Primary Examiner*—Anatoly Vortman
*Assistant Examiner*—Adrian S Wilson
(74) *Attorney, Agent, or Firm*—Morris Manning Martin LLP; Tim Tingkang Xia

(57) ABSTRACT

A mounting apparatus for mounting a data storage device defining mounting apertures, includes a bracket for accommodating the data storage device, a locking member, and a mounting member mounted to the locking member. The bracket includes a side plate having a first bulge strip and a second bulge strip. The first bulge strip defines an insertion hole, and the second bulge strip defines a locking hole opposite to the insertion hole. A number of through holes is defined in the side plate. One end of the locking member forms an insertion portion to be inserted in the insertion hole, and the other end of the locking member forms a locking portion to be engaged in the locking hole. The mounting member forms a number of mounting pins to extend through the through holes of the bracket and engage in the mounting apertures of the data storage device.

9 Claims, 5 Drawing Sheets

U.S. PATENT DOCUMENTS

| | | | |
|---|---|---|---|
| 7,295,432 B2 * | 11/2007 | Xu | 361/685 |
| 7,327,565 B2 * | 2/2008 | Chen et al. | 361/685 |
| 2004/0037049 A1 * | 2/2004 | Erickson et al. | 361/685 |
| 2004/0075978 A1 * | 4/2004 | Chen et al. | 361/685 |
| 2005/0190535 A1 * | 9/2005 | Peng et al. | 361/685 |
| 2006/0193111 A1 * | 8/2006 | Han | 361/683 |

* cited by examiner

MOUNTING APPARATUS FOR DATA STORAGE DEVICE

BACKGROUND

1. Field of the Invention

The present invention relates to mounting apparatuses for data storage devices, and particularly to a mounting apparatus for readily attaching a data storage device to a computer chassis.

2. General Background

Generally speaking, when a computer is assembled, a drive bracket is mounted in a computer enclosure, and then data storage devices are fixed to the drive bracket. The data storage devices comprise various combinations of hard disk drives (HDDs), floppy disk drives (FDDs), and compact disk-read only memory (CD-ROM) drives.

A conventional data storage device is generally attached to a drive bracket by bolts or rails. Fixing a data storage device to a drive bracket with bolts is unduly laborious and time-consuming. Furthermore, the computer enclosure needs extra operating space for carrying out the fixing operation. Fixing a data storage device in a drive bracket using rails is more convenient than using the above-described bolts. However, certain bolts are still needed to fix the rails to the drive bracket. Additionally, mounting systems using rails require a clearance between the data storage device and the drive bracket. This may cause electromagnetic interference (EMI) problems, and may lead to accumulation of static charges on the computer enclosure. Furthermore, the rails are generally made of plastic. This not only restricts grounding connection options between the data storage device and the drive bracket, but also tends to lead to extra maintenance because of the plastic rails easily wearing out and needing replacement. Examples are disclosed in U.S. Pat. Nos. 5,599,080, 6,826,045, and 6,853,549.

What is needed, therefore, is a mounting apparatus which readily secures a data storage device to a computer chassis.

SUMMARY

An exemplary mounting apparatus for mounting a data storage device defining mounting apertures, includes a bracket for accommodating the data storage device, a locking member, and a mounting member mounted to the locking member. The bracket includes a side plate having a first bulge strip and a second bulge strip. The first bulge strip defines an insertion hole, and the second bulge strip defines a locking hole opposite to the insertion hole. A number of through holes is defined in the side plate. One end of the locking member forms an insertion portion to be inserted in the insertion hole, and the other end of the locking member forms a locking portion to be engaged in the locking hole. The mounting member forms a number of mounting pins to extend through the through holes of the bracket and engage in the mounting apertures of the data storage device. Thus, the data storage device is readily and securely attached to the bracket.

Other advantages and novel features will become more apparent from the following detailed description when taken in conjunction with the accompanying drawings, in which:

DETAILED DESCRIPTION OF THE EMBODIMENTS

Figure 1:
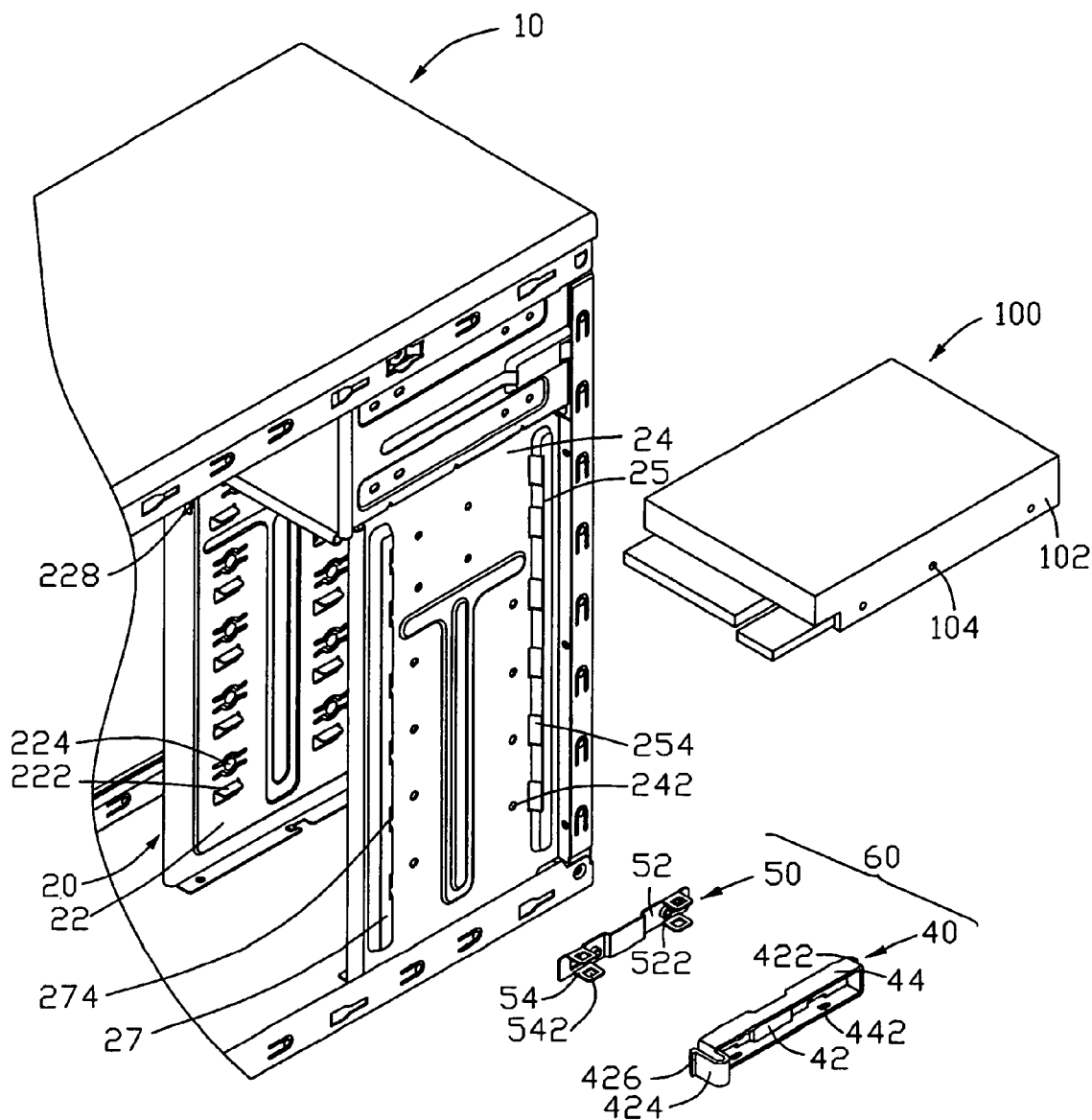
FIG. 1 is an exploded, isometric view of a mounting apparatus in accordance with a preferred embodiment of the present invention, together with a computer chassis and a data storage device, wherein the mounting apparatus includes a mounting device and a bracket, the mounting device includes a locking member and a mounting member.
Figure 2:
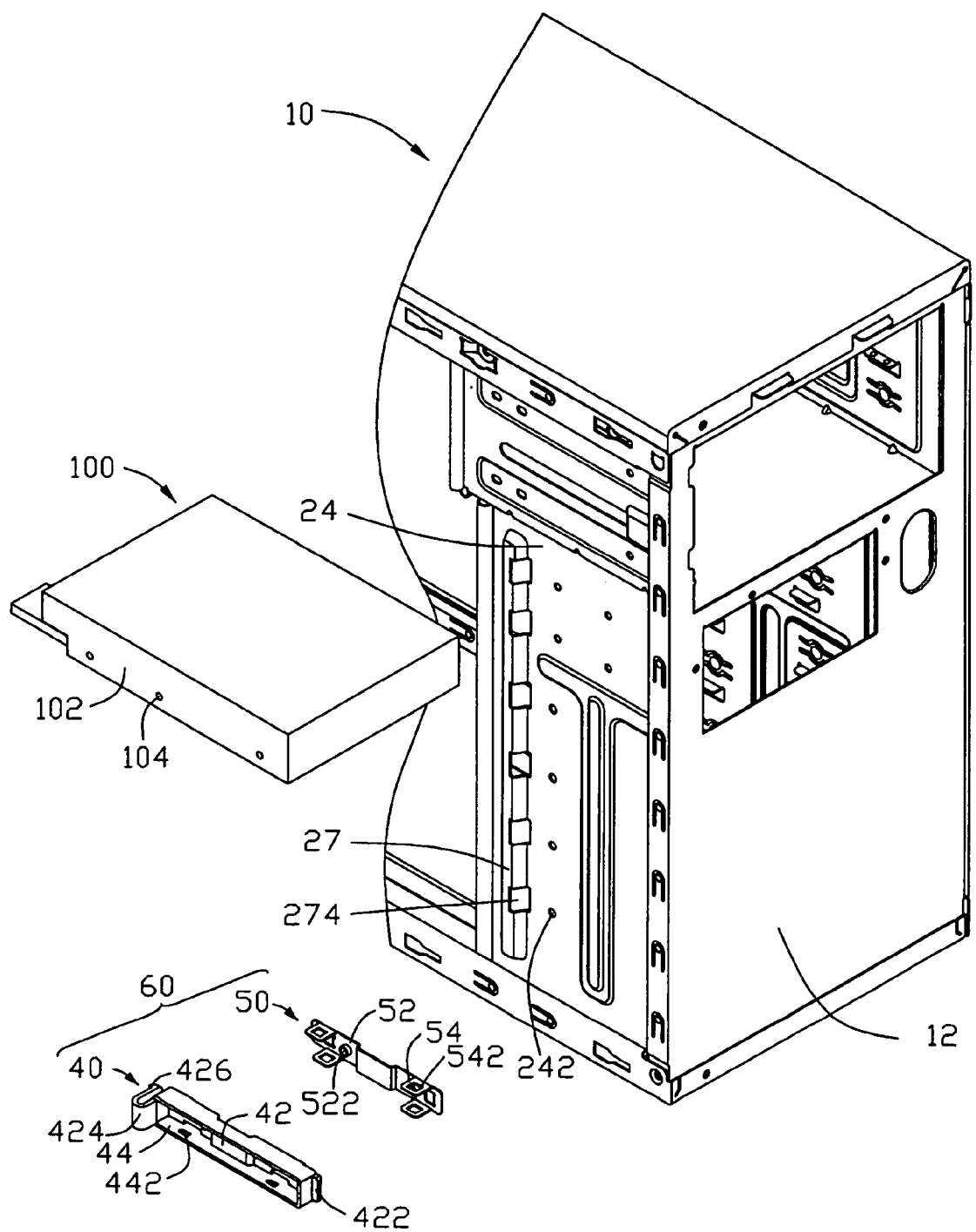
FIG. 2 is similar to FIG. 1, but viewed from another aspect.

Referring to FIGS. 1 and 2, a mounting apparatus of an electronic device like a computer in accordance with a preferred embodiment of the present invention is used for mounting a functional device like a data storage device 100 to a computer chassis 10. The mounting apparatus includes a bracket 20, which is mounted to the computer chassis 10, and an elongated mounting device 60. One sidewall 102 of the data storage device 100 defines a plurality of mounting apertures 104 therein.

The bracket 20 is fixed to a front panel 12 of the computer chassis 10. The bracket 20 includes a first side plate 24 and a second side plate 22 opposite to the first side plate 24. A plurality of support plates 222 is stamped from the second side plate 22 for supporting the data storage device 100. A plurality of resilient tabs 224 is stamped from the second side plate 22 to abut against the data storage device 100 to absorb vibration and provide effective grounding. A stop tab 228 is formed from a rear portion of the second side plate 22 for preventing the data storage device 100 from moving too far. The first side plate 24 is stamped outwardly to form a first lengthwise bulge strip 25 and a second lengthwise bulge strip 27 mutual parallel to one another. A rear side of the first bulge strip 25 defines a plurality of insertion holes 254, and a front side of the second bulge strip 27 defines a plurality of locking holes 274 corresponding to the insertion holes 254. A plurality of through holes 242 is defined in the first side plate 24 between the first and second bulge strips 25, 27.

Figure 3:
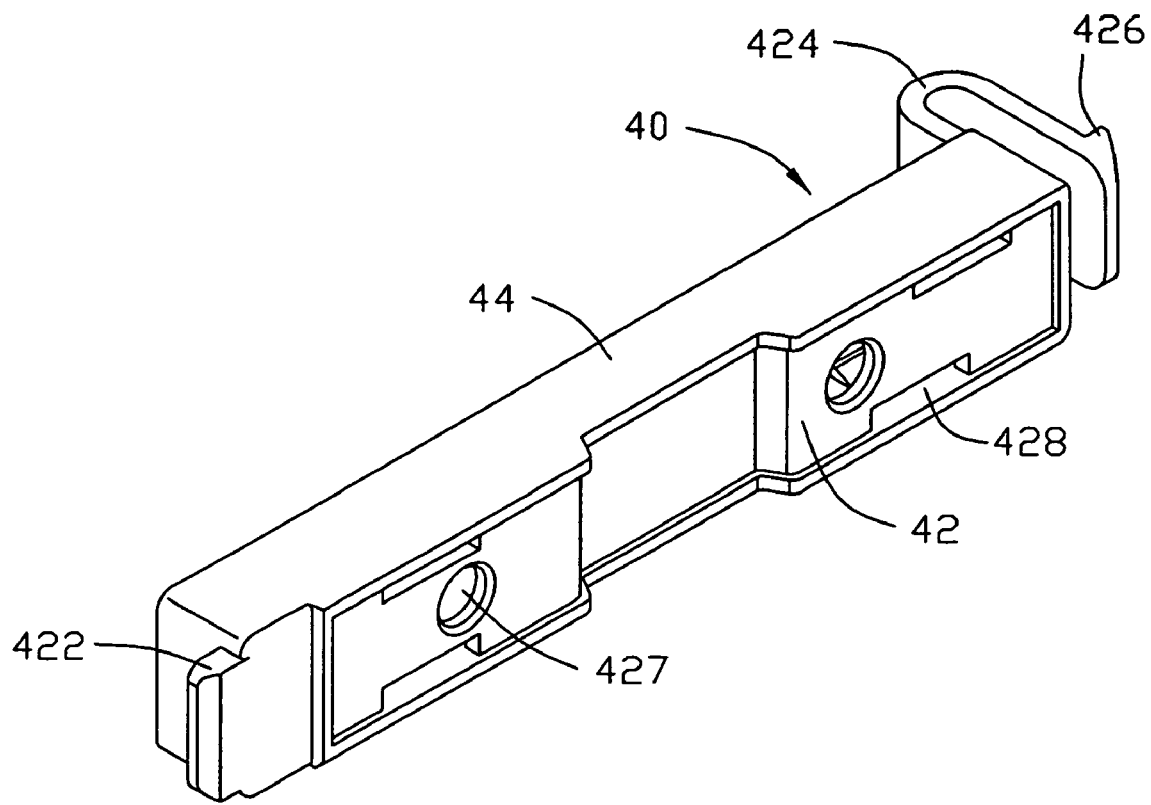
FIG. 3 is an enlarged, isometric view of the locking member of FIG. 1.
Figure 4:
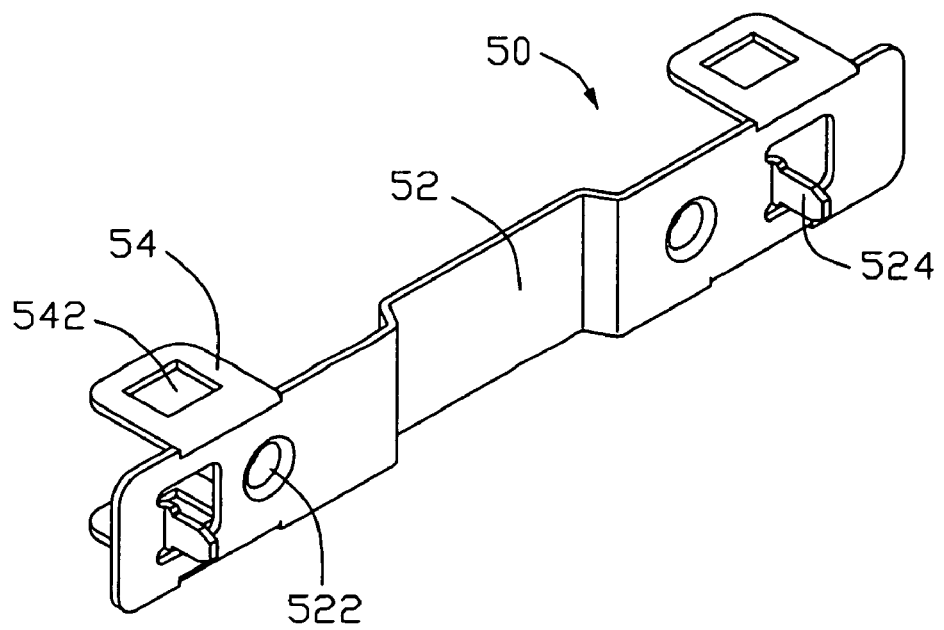
FIG. 4 is an enlarge, isometric view of the mounting member of FIG. 1.
Figure 5:
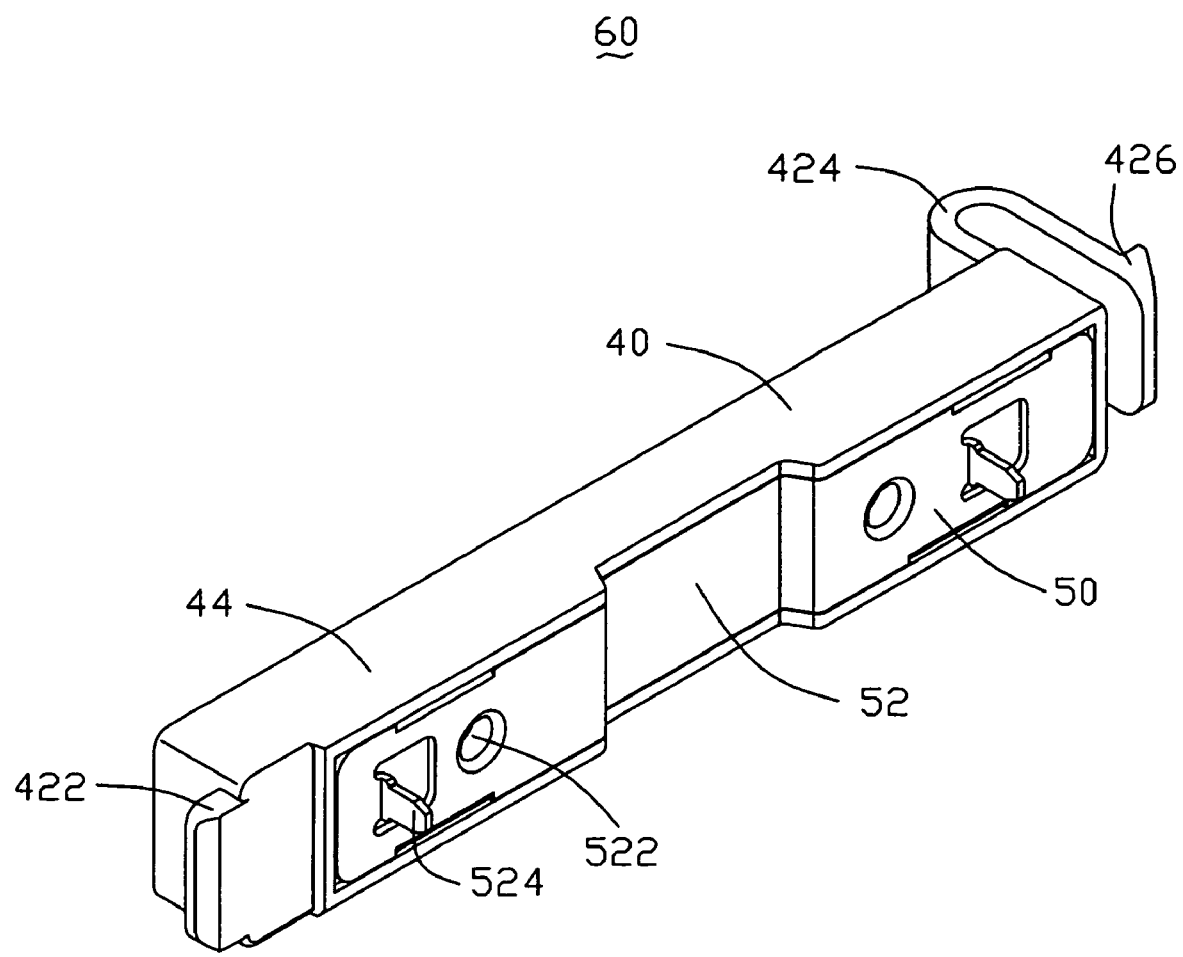
FIG. 5 is an assembled view of the mounting member of FIG. 4 and the locking member of FIG. 3.

Referring also to FIGS. 3-5, the mounting device 60 includes a locking member 40 and a mounting member 50. The locking member 40 is made of plastic, and includes a base 42 and two opposite side plates 44 extending from edges of the base 42. An insertion portion 422 extends forwardly from a front end of the base 42. A U-shaped locking portion 424 extends from a rear end of the base 42, along a direction perpendicular to the extension direction of the locking member 40. A hook 426 extends from a free end of the locking portion 424. A pair of positioning apertures 427 is defined in the base 42. Two pairs of through slots 428 are defined in two opposite sides of the base 42. Two pairs of wedge-shaped blocks 442 are formed from inner surfaces of the side plates 44 and in alignment with the through slots 428.

The mounting member 50 is integrally made by a metal sheet, and includes a main body 52, and two pairs of bent plates 54 extending from the main body 52 corresponding to the through holes 428. A fastening hole 542 is defined in each bent plate 54 corresponding to the blocks 442 of the locking member 40. A pair of positioning posts 522 extends from the main body 52 corresponding to the positioning apertures 427 of the locking member 40. A pair of mounting pins 524 extends from the main body 52 in a direction opposite to that of the positioning posts 522 extending in.

The bent plates 54 of the mounting member 50 extend through the through holes 428 of the locking member 40. The positioning posts 522 are inserted into the positioning apertures 427. When the bent plates of the mounting member 50 abut the corresponding blocks 442 of the locking member 40, the blocks 442 urge the bent plates 54 to be resiliently deformed towards each other. The blocks 442 of the locking member 40 are engaged into the fastening holes 542. The mounting member 50 is thus immovably secured to the locking member 40.

Figure 6:
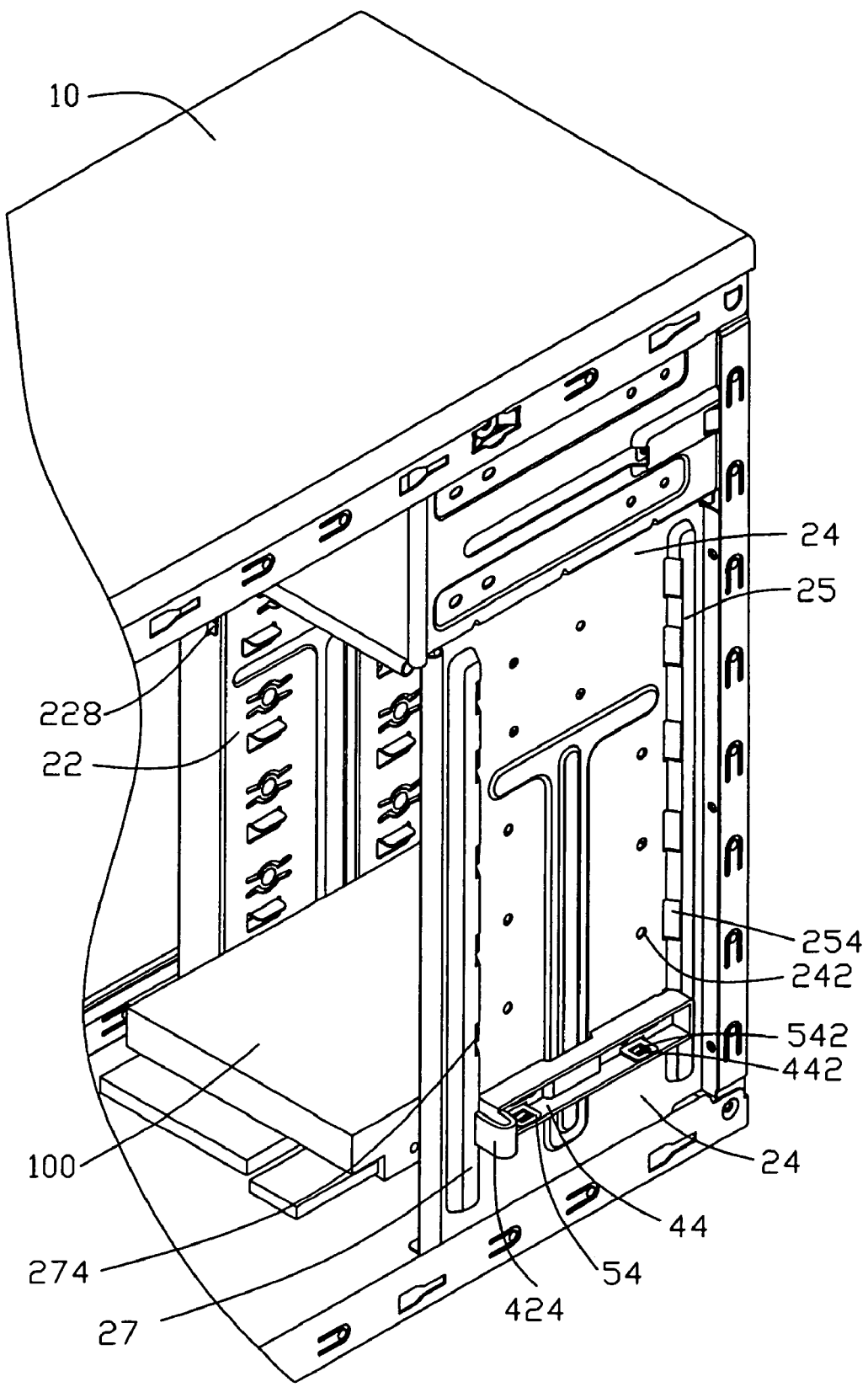
FIG. 6 is an assembled view of FIG. 1.

Referring also to FIG. 6, in assembly, the data storage device 100 is slid into the bracket 20, and supported by the support plates 222 of the second side plate 22. When the data storage device 100 reaches the stop tab 228 of the second side plate 22, the mounting apertures 104 of the data storage device 100 are in alignment with the through holes 242 of the first side plate 24. The insertion portion 422 of the locking member 40 is pivotably inserted into one of the insertion holes 254 of the first bulge strip 25, then the mounting device 60 is rotated towards the first side plate 24, so that the mounting pins 524 extend through the corresponding through holes 242 of the first side plate 24, and engage into the corresponding mounting apertures 104 of the data storage device 100. The locking portion 424 is resiliently deformed towards the rear end of the locking member 40. The hook 426 of the locking portion 424 snappingly engages into the locking hole 274 of the second bulge strip 27. Thus, the data storage device 100 is securely mounted in the bracket 20 by the mounting device 60.

In disassembly, squeeze the locking portion 424 of the mounting device 60 so that the hook 426 leaves the locking hole 274, the mounting device 60 is rotated outwardly from the first side plate 24, the mounting pins 524 are withdrawn from mounting apertures 104 of the data storage device 10.

In this preferred embodiment, the through holes 242 of the first side plate 24 of the bracket 20 are conventionally used for extension of screws, that is to say, users still can optionally apply screws to secure the data storage device 100, thereby different requirements of users can be satisfied.

In another preferred embodiment, the mounting device 60 can be only one piece, that is, the mounting pins 524 can be directly formed from the locking member 40.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments.

What is claimed is:

1. A mounting apparatus for mounting a data storage device defining a plurality of mounting apertures, the mounting apparatus comprising:
    a bracket adapted for accommodating the data storage device, the bracket comprising a first side plate having a first bulge strip and a second bulge strip, the first bulge strip defining an insertion hole, and the second bulge strip defining a locking hole opposite to the insertion hole, a plurality of through holes defined in the first side plate to be in alignment with the mounting apertures of the data storage device;
    a locking member, one end of the locking member forming an insertion portion to be pivotably inserted in the insertion hole, and the other end of the locking member forming a locking portion to be engaged in the locking hole, thereby securing the locking member to the bracket; and
    a mounting member immovably mounted to the locking member and located between the first side plate and the locking member, the mounting member forming a plurality of mounting pins to extend through the through holes of the bracket and engage in the mounting apertures of the data storage device;
    wherein the locking portion of the locking member is U-shaped, and forms a hook at a free end thereof to snappingly engage in the locking hole via urging the locking portion to be resiliently deformed towards the other end of the locking member.

2. The mounting apparatus as claimed in claim 1, wherein the locking member comprises a base and two side plates extending from two opposite sides of the base, a pair of through slots is defined in each of the sides of the base, a pair of blocks is defined in each of the side plates of the locking member; the mounting member comprises a main body and two pairs of bent plates extending from the main body, a fastening hole is defined in each of the bent plates to extend through a corresponding through slot of the base and engage with a corresponding block.

3. The mounting apparatus as claimed in claim 1, wherein the bracket comprises a second side plate opposite to the first side plate, a support plate is formed from the second side plate for supporting the data storage device.

4. The mounting apparatus as claimed in claim 1, wherein the first bulge strip and the second bulge strip are parallel to each other, the insertion hole is defined in a rear side of the first bulge strip, and the locking hole is defined in a front side of the second bulge strip.

5. A mounting apparatus for mounting a data storage device defining a mounting aperture, the mounting apparatus comprising:
    a bracket for accommodating the data storage device, the bracket comprises a first side plate and a second side plate opposite to each other, the first side plate forming a first bulge strip and a second bulge strip parallel to each other, the first bulge strip defining an insertion hole, and the second bulge strip defining a locking hole; and
    a mounting device comprising a locking member and a mounting member fixedly attached to the locking member, the locking member having one end rotatably inserted in the insertion hole, and a resilient U-shaped locking portion bent from the other end, a hook extending out from the locking portion and engaging with the locking hole via urging the locking portion to be resiliently deformed towards the other end, the mounting member forming a mounting pin corresponding to the mounting aperture of the data storage device.

6. The mounting apparatus as claimed in claim 5, wherein the locking member comprises a base and two side plates extending from two opposite sides of the base, a pair of through slots is defined in each of the sides of the base, a pair of blocks is defined in each of the side plates of the locking member; the mounting member comprises a main body and two pairs of bent plates extending from the main body, a fastening hole is defined in each of the bent plates to extend through a corresponding through slot of the base and engage with a corresponding block.

7. The mounting apparatus as claimed in claim 5, wherein the first bulge strip and the second bulge strip respectively have two sidewalls facing each other, the insertion hole and the locking hole are respectively defined in said two sidewalls.

8. An electronic device comprising:
    a chassis of said electronic device enclosing said electronic device;

a functional device of said electronic device removably installable in said chassis so as to perform a predetermined function of said electronic device in said chassis;

a bracket installable in said chassis and defining a space therein for accommodating said functional device when said functional device is installed in said chassis, said bracket comprising a side plate forming a first bulge strip and a second bulge strip parallel to each other; and a mounting device removably attachable to said side plate of said bracket and fixable between said first and second bulge strips by means of engaging therewith, said functional device being retainable in said space of said bracket when said functional device is in said space and said mounting device is fixed between said first and second bulge strips to be reachably engagable with said functional device;

wherein said mounting device comprises a locking member and a mounting member fixedly attached to said locking member and located between said side plate and said locking member, for being reachably engagable with said functional device, an insertion portion extending from an end of said locking member and pivotably engaging with one of said first and second bulge strips, said mounting device pivotable towards said side plate, a locking hole is defined in the other one of said first and second bulge strips, a resilient locking portion is bent from the other end of said locking member, said locking portion extends along a direction perpendicular to said elongated extension direction of said locking member, a hook extends out from a free end of said locking portion and engages with said locking hole when urging said locking portion to be resiliently deformed towards the other end of said locking member.

9. The electronic device as claimed in claim 8, wherein said first bulge strip and said second bulge strip have a sidewall respectively to face each other, an insertion hole is defined at said sidewall of said first bulge strip for pivotably receiving said insertion portion and said locking hole is defined at said sidewall of said second bulge strip so as to commonly position said locking member therebetween.

* * * * *